D. W. MacMILLAN.
METHOD OF MAKING EAR WIRE SCREWS.
APPLICATION FILED SEPT. 5, 1917.
1,268,862.
Patented June 11, 1918.
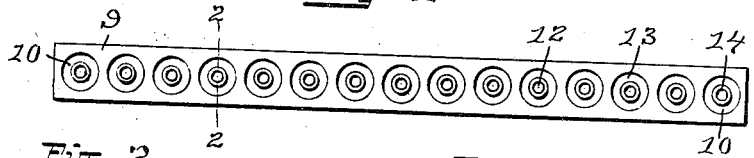
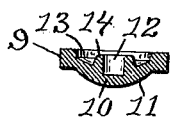
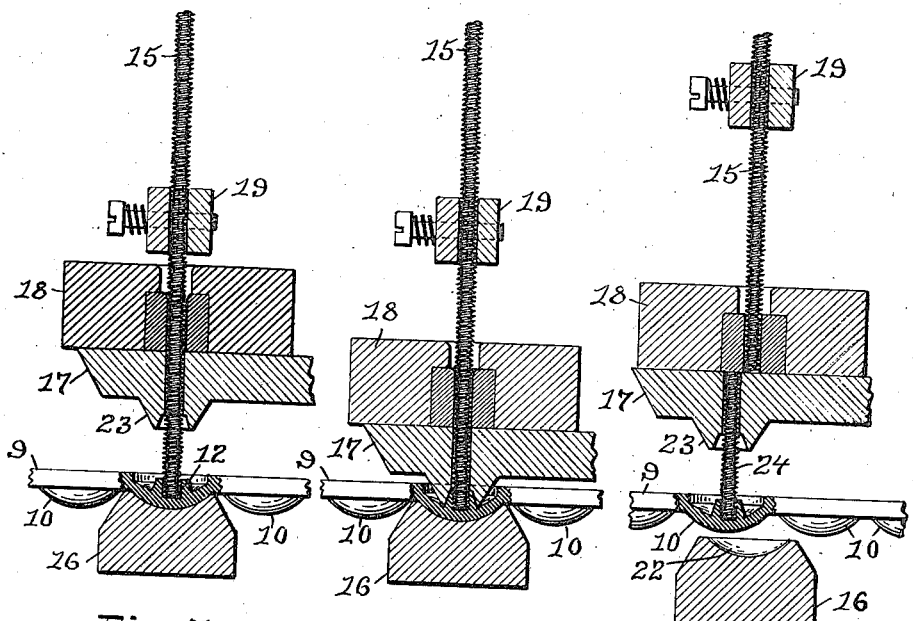
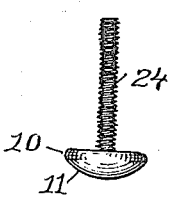
INVENTOR:
Daniel William MacMillan
by Chas. H. Luther
ATTORNEY

UNITED STATES PATENT OFFICE.

DANIEL WILLIAM MacMILLAN, OF PROVIDENCE, RHODE ISLAND.

METHOD OF MAKING EAR-WIRE SCREWS.

1,268,862.  Specification of Letters Patent.  Patented June 11, 1918.

Application filed September 5, 1917. Serial No. 189,872.

*To all whom it may concern:*

Be it known that I, DANIEL WILLIAM MACMILLAN, a native of Canada, residing at Providence, in the county of Providence and State of Rhode Island, have invented a new and useful Improved Method of Making Ear-Wire Screws, of which the following is a specification.

Ear-wire screws are used in that class of ear-ring which are clamped to the lobe of the ear. As heretofore made the screw-threaded stems are separately constructed in a machine to the number and length required and each screw-threaded stem then individually handled in another machine in the operation of securing an ear-pad to the end of each screw-threaded stem.

The object of my invention is to improve the method of making ear-wire screws for that class of ear-rings in which the ear-ring is secured by clamping the same to the lobe of the ear, whereby the operations of constructing the screw-threaded stems and fastening the ear pads to the stems, are accomplished by the use of my improved method, in one machine.

Further objects of my invention are to increase the product and reduce the cost of manufacturing ear-wire screws for ear-rings.

My invention consists in the peculiar and novel method of making ear-wire screws for ear-rings, as will be more fully set forth hereinafter and claimed.

Figure 1 is a face view of a strip of metal on which is formed a series of ear-pads.

Fig. 2. a transverse sectional view taken on line 2, 2 of Fig. 1 through the strip and one of the ear-pads.

Fig. 3 is a side view of a portion of a screw-threaded wire from which screw-threaded stems are formed.

Figs. 4, 5, 6 and 7 are sectional views illustrating different steps in my method of making the ear-wire screws, and Fig. 8 is a side view of the completed ear-wire screw.

All of the figures are enlarged to more clearly show the same, Fig. 1 approximately two diameters and Figs. 2 to 8 approximately four diameters.

In the drawing 9 indicates a strip of metal on which are formed a series of ear-pads 10, 10. Each ear-pad 10 has a rounded convex face 11, a cup shaped cavity 12, and a concentric annular depression 13 forming an annular wall 14 of the cavity, as shown in Fig. 2. The cavity 12 is shaped to receive the end of a screw-threaded wire 15, such as shown in Fig. 3. A lower holding die 16, two upper swaging and cutting off dies 17 and 18 and a spring clamp feeding device 19 are used for feeding the wire for swaging an ear-pad on to the end of the wire and for cutting a shank from the wire, as shown in Figs. 4, 5 and 6 and lower and upper cutting dies 20 and 21 as shown in Fig. 7, are used for cutting the completed ear-wire screw from the strip 9. The lower die 16 has a depression 22 in its top face which fits the concave face of an ear-pad. The upper die 17 has a die face 23 shaped to go over the wall 14 on the ear-pad and compress or swage the wall 14 on to the end of the wire 15. The die 17 sliding on the die 18 acts as a shear to cut the wire, as shown in Fig. 6, and the spring clamp feeding device acts to feed down a predetermined length of wire as required. The ear-wire screw consists of a ear-pad 10 and a screw-threaded stem 24 as shown in Fig. 8.

My improved method of making ear-wire screws consists in forming a series of ear-wire screw-pads 10, 10 on a metal strip 9, each ear-pad having a cavity 12 and an annular wall 14, passing the strip 9 between a lower die 16 having a depression 22 and an upper die 17 having a face 23, placing an ear-pad in the depression 22, intermittently feeding a predetermined length of a practically continuous screw-threaded wire 15 downward, by a spring clamp feeding device 19, with the end of the wire entering a cavity 12 in a pad 10, as shown in Fig. 4, closing the dies, as shown in Fig. 5, thereby swaging the wall 14 of the cavity onto the end of the wire, opening the dies and cutting off a predetermined length of the wire, thereby forming a screw-threaded stem on the ear-pad, then cutting out the ear-pad from the strip 9 by dies 20 and 21 as shown in Fig. 7, thereby completing an ear-wire screw, as shown in Fig. 8.

The principle operation in my improved method of making ear-wire screws consists in intermittently feeding a predetermined length of screw-threaded wire to the ear-pads, said screw-threaded wire coming from a reel. Although the wire is preferably cut after an ear-pad has been swaged onto the end of the wire, it is self evident that the wire could be cut before swaging the ear-pad onto the wire.

By the use of my improved method of making ear-wire screws, the time heretofore required in manufacturing is materially lessened and the product greatly increased at a reduced cost.

Having thus described my invention I claim as new,

The method of making ear-wire screws consisting in forming a series of ear-pads on a metal strip, each ear-pad having a cavity and a raised wall surrounding the cavity, passing the strip of ear-pads between suitable swaging dies, feeding a predetermined length of screw-threaded wire to a cavity in an ear-pad, closing the dies and swaging the wall of the cavity in the ear-pad on to the end of the screw-threaded wire and then cutting off a predetermined length of the screw-threaded wire, thereby forming a screw-threaded stem on the ear-pad.

In testimony whereof, I have signed my name to this specification.

DANIEL WILLIAM MacMILLAN.